UNITED STATES PATENT OFFICE.

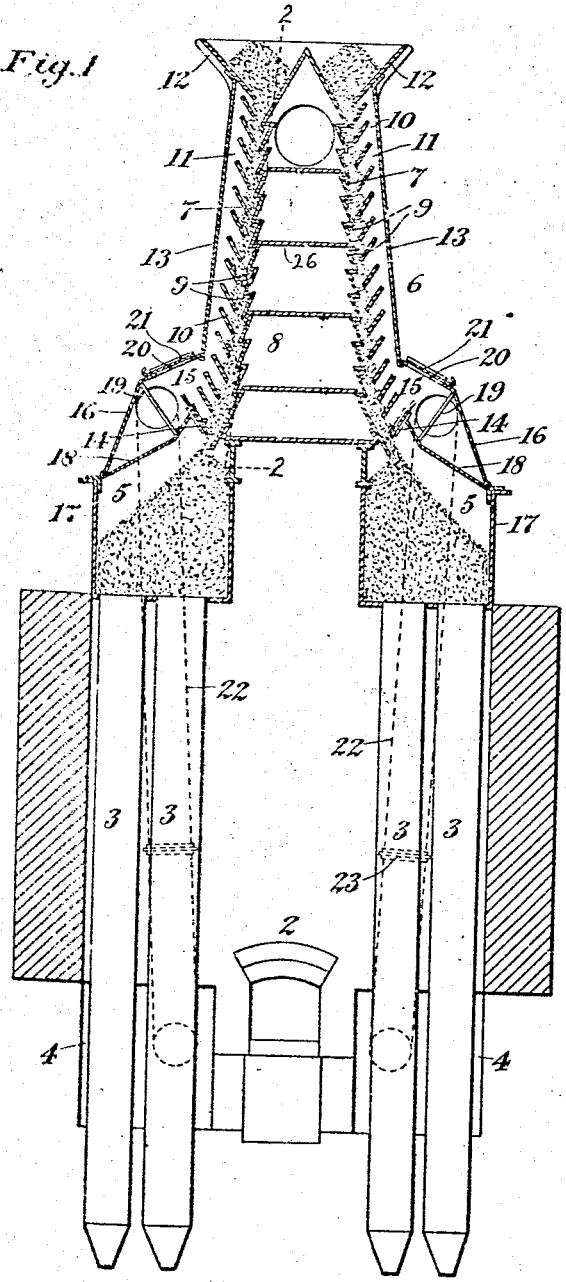

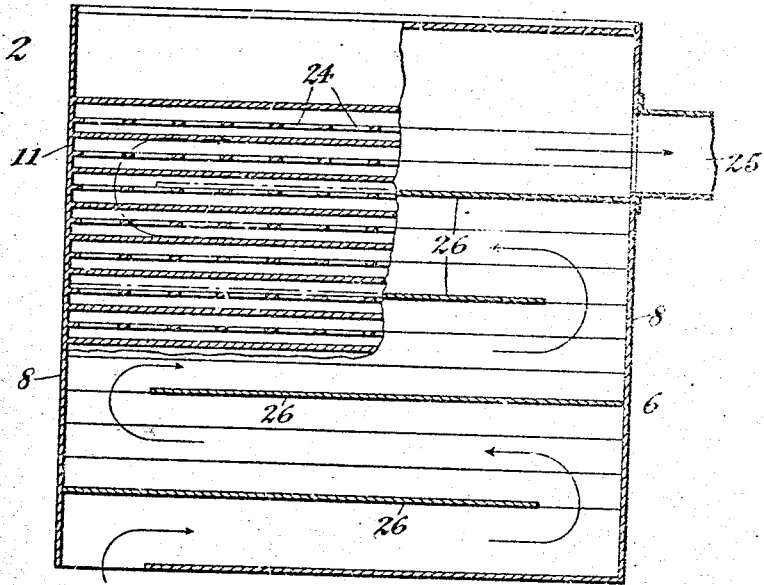
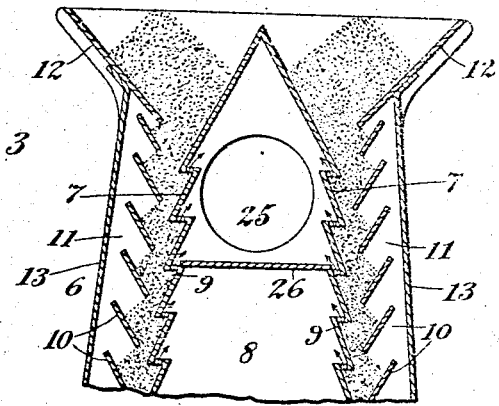

ROBERT S. KENT, OF BROOKLYN, NEW YORK.

APPARATUS FOR DRYING CHARCOAL.

984,931.

Specification of Letters Patent.  Patented Feb. 21, 1911.

Application filed March 25, 1910. Serial No. 551,432.

*To all whom it may concern:*

Be it known that I, ROBERT S. KENT, a citizen of the United States, and a resident of Brooklyn, in the county of Kings and State of New York, have invented certain new and useful Improvements in Apparatus for Drying Charcoal, of which the following is a specification.

This invention relates to an apparatus for drying charcoal, and particularly to an apparatus for drying the animal charcoal or bone-black known as "char" and used as a decolorizing agent, especially in the process of refining sugar.
The present invention is an improvement upon those disclosed in Patent No. 742,723, granted October 27th, 1903, to George M. Newhall and in Patent No. 871,705, granted November 19th, 1907, to Robert S. Kent.
One of the principal features of said Newhall patent is the provision of means for passing a current of heated air through a mass or stream of moist char for the purpose of drying the char; but in that patent the heated air does not flow in a substantially straight line following at all points the shortest path through the char, but passes first into the char, then into horizontal passages formed between the char and the side walls of the drier, traverses these passages to the ends of the drier and then passes into chambers communicating with the stack, the path through the char being of such length that it is difficult for the heated air to dry the char sufficiently. In said Kent patent the current of heated air is not passed through the char itself, but instead is passed into one or both ends of passages similar to those just referred to in connection with said Newhall patent and abstracts moisture from the wet char by contact with the surface of the char, after which it passes out between the ends of the drier into the central portion of the drier through ventilating openings in the side-walls down which the char flows, the object being to shorten the distance traversed by the currents of heated air in driers of the type in which said heated air comes in contact only with the surface of the char and to reduce the time required for proper drying of the char to about one-half.

The principal object of the present invention is to combine the main features of said Newhall and Kent patents—to wit, (1) passing a gaseous drying medium through a body of char, and (2) allowing it to escape as quickly as possible through the surface on which the char is carried—and to produce by this combination a new type of drier differing in construction and mode of operation from both of them. The main feature of this new drier is the provision of means for circulating a gaseous drying medium through a moving body of char substantially in the direction of the smallest dimension thereof so that the drying medium will follow the shortest course through said char, and will not, after saturation, remain in contact with the char but will escape as soon as it is saturated. In the preferred embodiment of this invention the wet char will flow down a horizontally-corrugated wall or walls of a char drier and form with the walls of the reëntrant angles of such corrugations horizontal passages having in the walls thereof ventilating openings or outlets covering preferably substantially the whole surface of such walls from end to end of the drier, and by suitable means a gaseous drying medium will be circulated directly through the char substantially in the direction of its smallest dimension and out through said ventilating openings, the line of flow of the drying medium being at all points substantially transverse to the char and to the passages formed by the reëntrant angles of the drier walls instead of being mainly lengthwise thereof, as in said Newhall and Kent patents.

In the drawings accompanying this specification and forming part of the present application there is illustrated apparatus embodying the main feature just described and also certain subordinate features which will be hereinafter described in detail and which are fully set forth in the appended claims.

In said drawings, Figure 1 is a vertical section and elevation of an apparatus for drying char embodying this invention; Fig. 2 is an enlarged vertical section of the upper portion of the apparatus or char-drier proper, the right-hand side of the view being a central vertical section and the left-hand side being a section in the line 2—2, Fig. 1; and Fig. 3 is an enlarged section, similar to Fig. 1, of the upper portion of the char-drier.

Similar characters designate like parts in all the figures of the drawings.

In carrying the invention into effect any suitable means may be employed for performing the functions hereinbefore recited. Preferably the well-known elements of a char-drying apparatus of the general type disclosed in said Newhall and Kent patents will be employed, these being suitably modified or added to as required for carrying out the invention. Among these well-known elements is a kiln, such as 2, of any suitable type, located under the char-drier proper and so constructed as to contain and heat a series of retorts, such as 3, which are as shown of well-known construction. Around the lower portions of the retorts 3 is another main element of such an apparatus, to wit, a cooling chamber, such as 4, formed in any well-known manner. Near the top of the kiln may also be located, as is usual, chambers, such as 5, for the reception of the dried char until it is passed into the retorts 3 to be revivified by re-burning in said retorts.

The char-drier proper preferably constitutes an upper extension of the outlet for waste products of combustion from the kiln, and is best constructed as a casing through which such products of combustion may circulate back and forth endwise of the drier in a zigzag path from the bottom to the top of the same. This char-drier is designated generally by 6. It has in this case a relatively high substantially vertical casing decreasing in cross-sectional area from the bottom to the top of the apparatus and of considerable width endwise of the side-walls but relatively narrow between such side-walls. Both of these side-walls are preferably horizontally corrugated to form walls zigzag in vertical section and having reentrant angles adapted to form ventilating passages, as in said patents. The casing of the char-drier shown here has two opposing side-walls 7 having such horizontal corrugations forming reëntrant angles and two straight vertical end-walls, which are designated by 8. The wet char shown in the drawings in descending a side-wall of this zigzag construction forms with the reëntrant portions of the casing horizontal passages, such as 9, the areas of which are determined by the angles of the side walls of the corrugations and by the flow-line of the wet or partially dried char. There will usually be combined with such a side-wall or side-walls suitable means for forming therewith a passage or passages for permitting the descent of a zigzag stream or streams of char. These parts are so formed and disposed that the stream of char descending between the coöperating surfaces is a comparatively thin one, though of great width. The means employed for forming such a zigzag stream or streams of descending char are or may be the same as heretofore used, that is, they may be one or more series of plates, such as 10, secured to suitable supports 11, at the upper ends of which may be formed the usual hopper or hoppers for receiving in bulk the moist char. In the drawings two hoppers are shown as formed by diverging upper portions of the side-walls of the drier and by plates, such as 12, secured to the supports 11. All of these features are common to the two driers disclosed in said Newhall and Kent patents. In addition to the aforesaid parts common to both of said driers there are preferably employed certain features disclosed only in said Newhall patent, and also certain other features disclosed only in said Kent patent. For the purpose of supplying the gaseous drying medium to the moving bodies or streams of wet char a construction is employed preferably substantially like that disclosed in said Newhall patent. Thus in the construction shown herein the char descending the corrugated walls and zigzag plates 7 and 11 is inclosed by aprons or cover-plates, such as 13, properly secured to the end-walls of the casing, which serve to keep the drying medium circulating between the inclined plates and the zigzag walls. The bottoms of the zigzag passageways formed between these plates and said walls may be closed or suitably controlled to shut off or permit the flow of char by means of valves or gates, such as 14. At the bottoms of these zigzag passageways and at each side of the drier, chambers, such as 15, are preferably formed by means of curved plates, such as 16, which extend from the lower edges of the aprons or cover-plates 13 to the outside walls 17 of the chambers 5, and by means of plates, such as 18, which extend from the walls 17 to the valves or sliding gates 14. These parts are suitably spaced apart and supported to form the chambers by means of spacing pieces or braces 19, and the plate 16 forming the outer wall of each chamber preferably has openings 20 therein through which access may be had to the valves or gates 14. These openings may be closed by sliding doors or covers, such as 21. The chambers 15 formed by these parts at opposite sides of the drier will preferably communicate with the cooling chamber 4 surrounding the retorts, pipes being shown at 22 leading from said cooling chamber and connecting at their upper ends with the chambers 15. These pipes serve to carry the air heated by the retorts in the cooling chamber to the char as it flows down over the zigzag side-walls of the drier. The lowermost portions of the chambers formed by the plates 16 and 18 are supported in such a manner, preferably on the upper edges of the walls 17 of the chambers 5, that they may be tilted back when it is necessary to remove any of the retorts, they being hinged to said side-walls for this purpose. In order to do this, the pipes 22 may have slip connections with the chambers 15 for the purpose of permitting quick connection or disconnection of the same, or may be otherwise suitably constructed or combined with the other parts to permit the tilting or swinging of the lower portions of said chambers 15. Suitable valves or dampers, such as 23, will usually be placed at convenient points in the pipes 22 to control the flow of heated air from the cooling chamber 4. All of these parts are or may be substantially like those disclosed in said Newhall patent. In addition to said parts of the Newhall drier certain features found only in the said Kent patent may also be employed. The principal one of these is the use of ventilating openings or outlets through the side-walls 7 of the drier. In said Kent patent these ventilating openings or outlets are shown as placed at points substantially intermediate of the end-walls of the drier, but in the present construction in addition to such intermediate openings other openings or outlets are provided, preferably of such a nature that substantially the whole surface of each of the side walls 7 is filled in a horizontal direction with ventilating openings from end to end of the drier, the arrangement of these openings being such as to permit the drying medium to pass through the char and out through said openings in substantially a straight line at all points in the area of each stream of char, the drying medium thus following the shortest course substantially straight through the char at all points in the area thereof. Said ventilating outlets or openings may be formed in any suitable way, preferably as indicated at 24, in the upper or horizontal wall of each reëntrant angle, the drying medium saturated with the moisture, etc., abstracted from the char passing directly through these openings or outlets into the interior of the drier and thence through an opening 25 in an end-wall of the drier directly to the stack.

It will be noticed that in this improved type of char-drier the chambers 15 extend from end to end of the drier, and, unlike the types of driers shown in said Newhall and Kent patents, there are no chambers at the ends of said drier for any purpose. The heated air employed herein as the drying medium is taken, as before indicated, from the cooling chamber 4 and is drawn or forced either by natural or forced draft through the chambers 15 and substantially straight through the descending streams of char, passing through said streams of char and through the openings or outlets 24 in a substantially horizontal path following the shortest course through said char, the means employed being any suitable for the purpose, such for example as that disclosed in said Kent patent. In the interior of the char-drier all of the saturated streams of air emerging from the outlets 24 mingle with the waste products of combustion from the kiln and pass with said waste products through the opening 25 in the end-wall of the drier. In order to utilize most effectively the heat of these waste products of combustion there is preferably employed in the present drier, as in those disclosed in the aforesaid patents, a series of partitions, such as 26, disposed substantially horizontally in the casing and having openings at their opposite ends alternately, as in said patents, for the purpose of prolonging the time occupied by the waste products in passing over the inner surfaces of the side-walls 7 out of contact with the char, these partitions forming a zigzag path for all of the waste products (including both the products of combustion and the moisture-laden drying medium before referred to). In the passage of the waste products of combustion through this zigzag path their full heating and drying effect is utilized.

What I claim is:

1. In an apparatus for drying charcoal, the combination with a substantially vertical wall for receiving a downwardly flowing body of char said wall having ventilating openings therethrough substantially throughout its whole area, of a kiln, means for circulating the hot products of combustion from the kiln in contact with one side of said wall and out of contact with the char at the other side of such wall, and means for circulating heated air through said body of char substantially in the direction of the smallest dimension thereof and out in the same direction through said ventilating openings.

2. In an apparatus for drying charcoal, the combination with a horizontally-corrugated wall for receiving a downwardly flowing body of char said wall having ventilating openings therethrough substantially throughout its whole area, of a kiln, means for circulating the hot products of combustion from the kiln in contact with one side of said wall and out of contact with the char at the other side of such wall, and means for circulating heated air through said body of char substantially in the direction of the smallest dimension thereof and out in the same direction through said ventilating openings.

3. In an apparatus for drying charcoal, the combination with a casing having a pair of opposed substantially vertical walls for receiving two downwardly flowing streams of char each of said walls having ventilating openings therethrough substantially throughout its whole area, of a kiln, means for circulating the hot products of combustion through the kiln in contact with the inner sides of both of said walls but out of contact with the char at the outer sides of such walls, and means for circulating heated air through each of said streams of char substantially in the direction of the smallest dimension of each stream and out in the same direction through said ventilating openings.

4. In an apparatus for drying charcoal, the combination with a pair of opposed horizontally corrugated walls each forming reëntrant angles the walls of which have a multiplicity of ventilating outlets therethrough covering substantially their whole areas and form with two downwardly flowing streams of char two series of horizontal passages, of a kiln, means for circulating the hot products of combustion through the kiln in contact with the inner sides of both of said walls but out of contact with the char at the outer sides of such walls, and means for circulating heated air through each of said streams of char substantially in the direction of the smallest dimension of each stream and out in the same direction through the ventilating outlets of each horizontally-corrugated wall.

5. In an apparatus for drying charcoal, the combination with a casing having a pair of opposed horizontally corrugated side walls each forming reëntrant angles, the walls of which have a multiplicity of ventilating outlets therethrough covering substantially their whole areas and form with two downwardly flowing streams of char two series of horizontal passages, of a kiln, means for circulating the hot products of combustion from the kiln through said casing out of contact with the char, and means for circulating heated air through each of said streams of char substantially in the direction of the smallest dimension of each stream and out in the same direction through the ventilating outlets of each horizontally corrugated wall into the interior of said casing.

6. In an apparatus for drying charcoal, the combination with a casing having endwalls and a pair of opposed horizontally-corrugated side walls for receiving two downwardly-flowing streams of char of the full width of said side-walls each of said side-walls having ventilating openings therethrough substantially throughout its whole area, of a kiln, means for circulating the hot products of combustion through the kiln in contact with the inner sides of both of said walls but out of contact with the char at the outer sides of such walls, and means for circulating heated air through each of said streams of char at all points in the width of each stream and substantially in the direction of the smallest dimension of each stream and out in the same direction through said ventilating openings.

Signed at New York, in the county of New York, and State of New York, this 21 day of March A. D. 1910.

ROBERT S. KENT.

Witnesses:
LAURA E. SMITH
R. CHAMPION.